Aug. 21, 1934.                T. M. DE LA GARDE                1,970,844
                              MOTION PICTURE CAMERA
                              Filed Jan. 29, 1932            6 Sheets—Sheet 1

INVENTOR,
T. M. De La Garde;
BY F. E. Maynard,
ATTORNEY.

Aug. 21, 1934.   T. M. DE LA GARDE   1,970,844
MOTION PICTURE CAMERA
Filed Jan. 29, 1932    6 Sheets-Sheet 3

INVENTOR.
T. M. De La Garde;
BY F. E. Maynard
ATTORNEY

Aug. 21, 1934.  T. M. DE LA GARDE  1,970,844
MOTION PICTURE CAMERA
Filed Jan. 29, 1932  6 Sheets-Sheet 4

INVENTOR,
T. M. De La Garde;
BY F. E. Maynard,
ATTORNEY.

Aug. 21, 1934.       T. M. DE LA GARDE         1,970,844
                     MOTION PICTURE CAMERA
                     Filed Jan. 29, 1932       6 Sheets-Sheet 5

INVENTOR,
T. M. De La Garde;
BY F. E. Maynard
ATTORNEYS.

Fig. 15.

Patented Aug. 21, 1934

1,970,844

UNITED STATES PATENT OFFICE 1,970,844

MOTION PICTURE CAMERA

Theodor M. De La Garde, Los Angeles, Calif., assignor of three-fourths to Thomas L. Tally, Beverly Hills, Calif.

Application January 29, 1932, Serial No. 589,683

16 Claims. (Cl. 88—17)

This invention relates to cameras and especially to motion picture cameras of the type disclosed in application Ser. No. 557,840 filed August 18, 1931, to which reference is made for general and detail descriptions of the camera and of which this application is, in part, a continuation.

It is an object of the present invention to provide several refinements in details of construction and combination of elements in the camera as will be more particularly disclosed herebelow. One of the objects is to provide a camera in which rotative elements, such as film guide rollers and various transmitting gears having substantially noiseless bearing parts, for the purpose of enabling the operation of the relatively rotating parts at their normal high speed with the least possible transmission of noise vibrations incident to their operation.

A further object is to provide means, in a camera of the type here concerned and which involves a bodily demountable, double reel holding magazine, for serving the dual purpose of locking the demountable magazine in applied position on the camera case and at the same time forming a light seal to eliminate light leakage at film passages from the magazine to the camera case. In this connection an object is to provide means for automatically actuating the lock means as a case door is closed and serve as a safety in case the operator omits to manually set the locking means. Further, in this connection, it is an object to provide means for automatically effecting the action of a controlling shift lever in the box and which is used to release certain driving mechanisms to enable the threading of a film over feed sprockets in the magazine, and further to provide for such automatic control action co-incidently with the locking of the magazine in the camera case.

Another object is to provide a motion picture film movement including means to facilitate the threading of the film into position between the aperture plate of the camera and the film movement.

Further, an object is to provide for the ready accurate attachment and detachment of the turntable to and from the tripod leg assembly, as is extremely desirable in the case of motion picture cameras where it is advantageous to change cameras, each having its own turntable adapted for mounting on the relative tripod. It is desirable to provide each camera with its own turntable rather than to demount camera from a turntable which forms an inseparable part of a tripod.

The invention consists in certain advancements in this art as set forth in the ensuing disclosure and having, with the above, additional objects and advantages as hereinafter developed, and whose construction, combination and details of means, and the manner of operation will be made manifest in the description of the herewith illustrative embodiment; it being understood that modifications, variations and adaptations may be resorted to within the scope, principle and spirit of the invention as it is more directly claimed hereinafter.

The apparatus includes a turntable 2 with a rigid pillar 3 at one side of its top and providing a journal 4 for a trunnion 5 of a housing part or gear case 7 which encloses a mechanism fully set forth in the parent application (and in which power is transmitted from a counter shaft 48, by transmission gears 45—46—47, to a reduction gear 43). The housing includes a box or camera chamber 16 closed at one side by a door 17 whose bottom lip 18 closes against a dome 19 of the applied, demountable, two-reel magazine 21.

Figure 11:
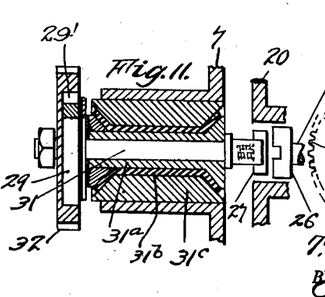
Figure 11 is a detail, sectional view showing the noise-killing mounting of a transmission gear element of the camera train.
Figure 12:
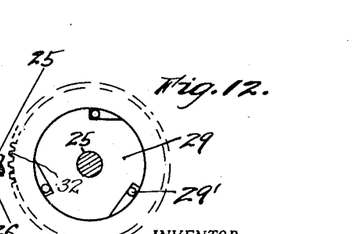
Figure 12 is a side view of the said gear and a one-way drive clutch connecting the driving shaft to the said gear.

In the magazine is a pair of film winding spindles 25, part of one of which is shown in the sectional detail, Fig. 11, with a clutch head 26 to interlock with a drive stud 27 which projects from the gear casing 7 and forms part of an automatic action device whereby either reel can be operated, at will, as take-ups. The magazine is a bodily attached unit and as it is set into place against the gear casing 7 the clutch part 26 of each shaft 25 interlocks with its driver 27 of the driving mechanism.

Figure 5:
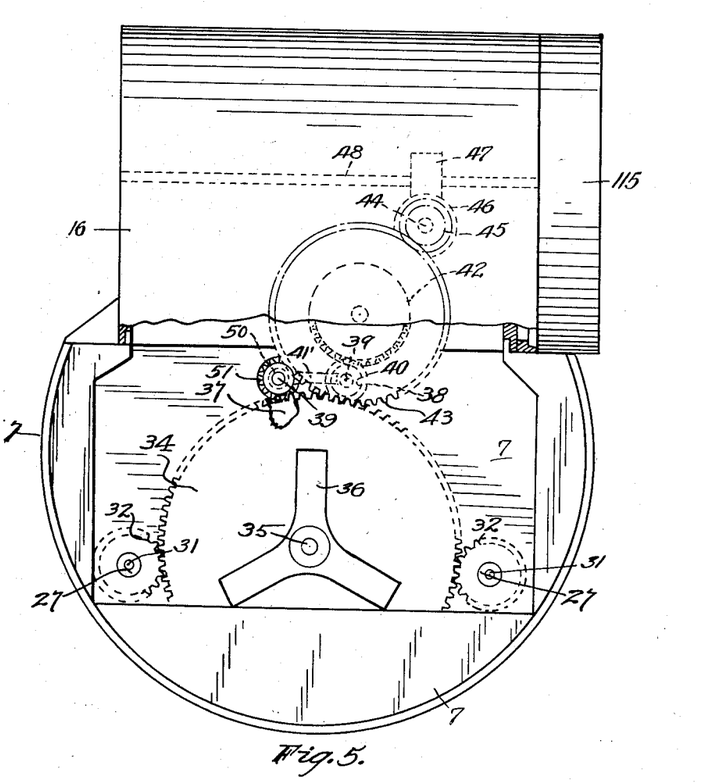
Figure 5 is a front elevation of a gear casing and mechanism therein, and a part of the camera housing.

This drive action is secured by means of a roller-type clutch disc 29 carrying clutch rollers 29' free-running in one direction in a drive gear 32, Fig. 5, there being one for each reel (23—24). The gears 32 are loose on the shafts 31 of the discs 29. The drive shafts 31 and studs 27 are a unit. The clutches 29 are designed to drive their relative magazine spindles 25 in opposite directions and one will free wheel while the other is driving its reel.

Figure 4:
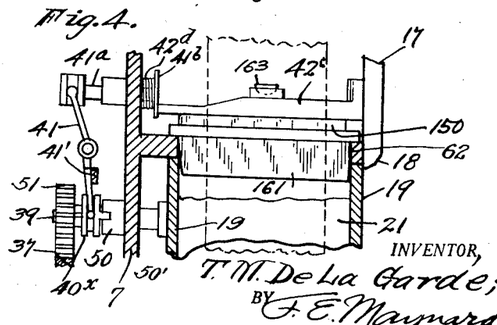
Figure 4 is a detail showing the locking of the applied magazine to the camera case and illustrates a clutch controlling device as motivated by a closed door of the camera case.

The gears 32 are in constant mesh with a large intermediate gear 34, Fig. 5, loose on its trunnion 35 and under control of a spring clutch 36; the trunnion being driven by a gear train including a master gear 37, parallel with gear 34, and constant speed pinion 38 loose on a stud 39 and adapted to be clutched thereto by action of a clutch lever 41, Fig. 4. This lever has a transverse part 41' (shown in section in Fig. 4 and in dotted lines in Fig. 5) which carries a pair of clutch collars 40ˣ to concurrently engage with or release respective clutch members 40 and 50 mounted on respective studs 39 of gears 38—51 (Fig. 5) which are coplanar and in constant mesh with the master gear 37. The gear 38 is constantly driven by a gear 42 which is parallel with and fixed to larger gear 43; this, (as shown in the parent case) being operated by power from the counter shaft 48 (Fig. 10).

A feature of this invention is that the lever 41 is automatically operated to release the pinions 38—51 from film drive effort when a film F is to be threaded in or unthreaded from the camera box 16. For this purpose, the lever 41 is connected to a stem 41ᵃ, Fig. 4, of a button 41ᵇ pressed by a spring 42ᵈ against a cam-bar 42ᶜ slidably mounted on a trap-door 150, which is hinged at 151 in the bottom of the box 16 and has a throat collar 161 playing in the film passageway 62 and of such depth as to project down into the film aperture of dome 19 of the applied magazine. The trap door is pressed upward by a spring 162 and is under control of the cam-bar 42ᶜ, which rides under a fixed post-head 163.

To apply a magazine, the cam-bar 42ᶜ must be pulled out manually so that the collar 161 will move up, under action of spring 162, to clear the dome 19. The magazine is slid into place and then the operator may press in the cam-bar 42ᶜ (or it will be pressed in by the closing action of the lid 17); the cam-bar causing the trap door 150 to move down and the collar 161 to enter the crown and latches it in place and the magazine cannot be removed until the latch part is again opened. The collar 161 also forms a light-stop to protect film passing through the collar from the magazine to the camera box 16 and the movement.

If the lid or cover 17 is opened and the cam-bar 42ᶜ is pulled outward manually the trap-door springs up and unlatches the magazine so that this can be withdrawn from the camera. At the same time the lever 41 is pulled over by its spring 42ᵈ, the collars 40ˣ are de-clutched from pinion 38, and like pinion 51 driven by gear 37, Fig. 5, to free related film feed spools.

The dome 19 of the magazine forms a chamber apart from reel chambers and contains loop feeding sprockets 39'—50' driven by respective clutch parts 40—50 when the collars are engaged therewith.

Figure 13:
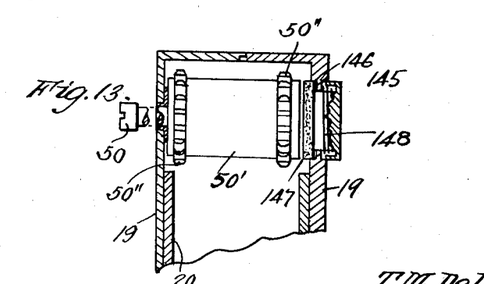
Figure 13 is a detail sectional view showing a thumb button film loop making device.

The loop feeding sprockets are adapted for direct manual operation by means of buttons 145 exposed on the back of the magazine and turnable in bearings 146 therein, Fig. 13. The inner ends of the buttons are provided with friction pads 147 to engage and turn the near end of a respective roller sprocket, as 50', when the button is pushed in and turned by thumb or finger pressure. The buttons are normally thrust outward by springs 148 to clear the respective sprocket.

Figure 3:
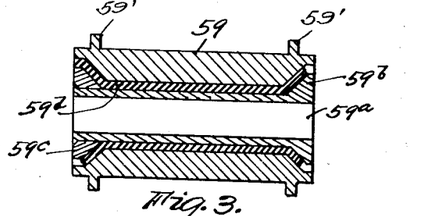
Figure 3 is a sectional detail of the roller to disclose its sound insulating structure.

Just below the sprockets 39'—50' is a guide roller 59, which is adjustably mounted, (as disclosed in the parent application), and of such construction as to eliminate, as far as practical, generation and transmission of undesired noises in the apparatus; especially when used for picture and sound recording. Fig. 3 shows the roller 59 as having a center journal 59ᵃ with conical heads 59ᵇ—59ᶜ concentrically compacting a rubber jacket 59ᵈ in the bored body of the roller, whose ends are counter bored complementary to the head cones so that the roller body, while firmly mounted and truly centered, is wholly supported on a rubber cushion and made noiseless.

In carrying out the sound killing effect, the clutch shaft 31 is mounted in a skein 31ᵃ centered in a rubber jacket 31ᵇ compressed in a bushing 31ᶜ whose ends are countersunk complementary to cone-heads on the skein 31ᵃ.

The film F leads to a movement shell 66 whose front face is concentric with and slightly spaced from a film race block 70 which can be pressed into place and locked by the camera key 70' having a blade part adapted to engage a contiguous keeper. At the aperture is hinged a tilting frame 73 in whose upper end is pivoted a presser and guide plate 73ᵃ whose lower end is pivoted on a draw bar 74 slidable longitudinally in the box by action of a fast-pitch screw 73ᵇ engaging a nut 73ᶜ on the draw-bar. The screw 73ᵇ has a disc 73ᵈ removably engageable with a crank pin 73ᵉ on a small gear 73ᶠ operated by gear train 73ᵍ powered by a hand crank 73ʰ mounted on the outside of the camera box 16, for a purpose later explained.

Means are provided to make a direct view focus through the camera box on the lens axis and for that reason the guide gate 73 is tiltable back and away from the aperture A, by means above described. Then a focusing tube 109 having arms 110 pivoted on an axis to one side of the lens axis is swung down laterally by means of a crank handle 111, which is on an axis concentric with the gate retracting crank 73ʰ.

To fully retract the film loop out of the way the loop is rove between a pair of guide rollers 73$^i$ on the inner end of the draw-bar 74 and the frame 73 and gate 73$^a$ pulled out quite flat by the bar 74.

A feature of this invention resides in the focusing of the device, the tube of which is provided, at one end, with a ground glass frame 112 having a ground glass G and pressed outward by a set of springs 113 set in a carriage 114 telescoping in the tube and normally retracted by a spring 114$^a$ to a limit determined by a stop pin 115 playing in a slot 116 in the tube 109. When the tube is swung down to lens axis of aperture A, a lever 117, pivoted at 118 on one side of the tube and having a tappet lug 119, to strike on the shell 66, is then rocked and causes a pin 119$^a$, on the lever, to press the carriage 114 outward and force the ground glass out flat against the focal plane of the film in the race at the aperture. As the ground glass comes to the focal plane it stops on the race and the springs 113 compensate for further stroke of the carriage by lever 117. All this action is accomplished by movement of the focusing handle 111, and follows the retraction of the film loop and the guide gate.

When the focusing is done, the handle 111 is thrown back and lifts the tube from lens line and the spring 114$^a$ retracts the carriage 114 and the ground glass and thus protects the film and race from scratching.

In the tube is an anastigmatic, objective lens O which is preferably of a 2-inch focal length, corrected combination, hyper, tessar, tacher, protar or the like), reversing the inverted image. The image from lens O is then taken up by a corrected field lens C mounted in an eye-piece 120 on the back of the camera and in line with an achromatic eye-piece lens L showing an enlarged, upright image of the ground glass picture.

The wall of the box to which the eye-piece is attached has a light hole 120$^a$ on the lens line and when the focusing tube is shifted to focusing position, it engages an eye-piece, hole shutter 121 and presses this out of shutting position against the closing effort of a spring 122. As the tube is moved from focusing position, the spring automatically closes the shutter 121 to prevent light entry to the film loop box.

As clearly shown, the magazine 21 is formed of front and back sections medially separable and being connected by a bottom hinge 21$^a$. The magazine is applied loaded and the sections are never opened except when removed for loading or unloading in a dark room. When in place it is secured by the latch collar 161 even though the lid 17 may be open and can only be removed by release of the latch from the bolt 42$^c$.

Figure 1:
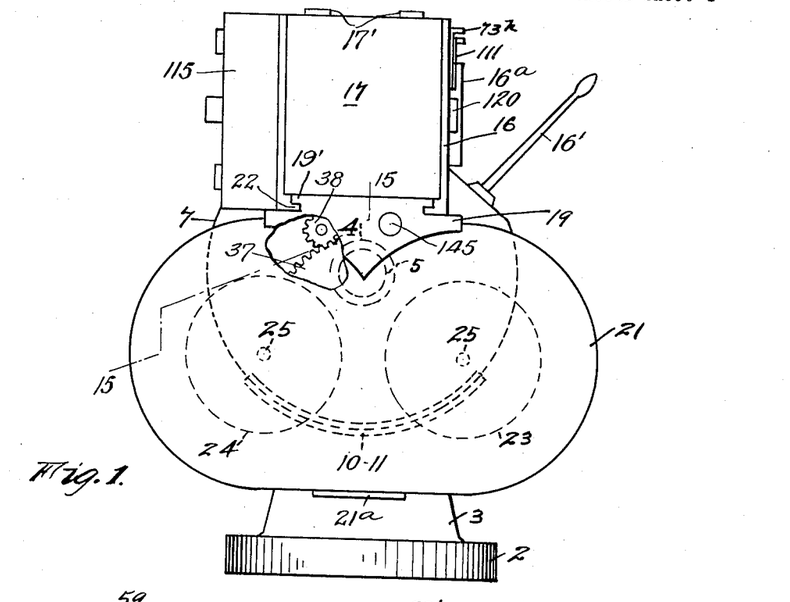
Figure 1 is a side elevation of the improved camera combined with its own turntable and having an applied, detachable magazine.

In Fig. 1 the door 17 is shown as hinged at 17' on the top of the box. The box has at the rear a fixed camera tilting handle 16' and at the front the box is provided with a lens turret 115 hinged at 115' to the box. On the rear of the box is shown a gear hood 16$^a$ for the gear system 73$^g$ and worm drive of shaft 48. Fig. 1 is broken away to show a part of the internal gear mechanism.

Figure 15:
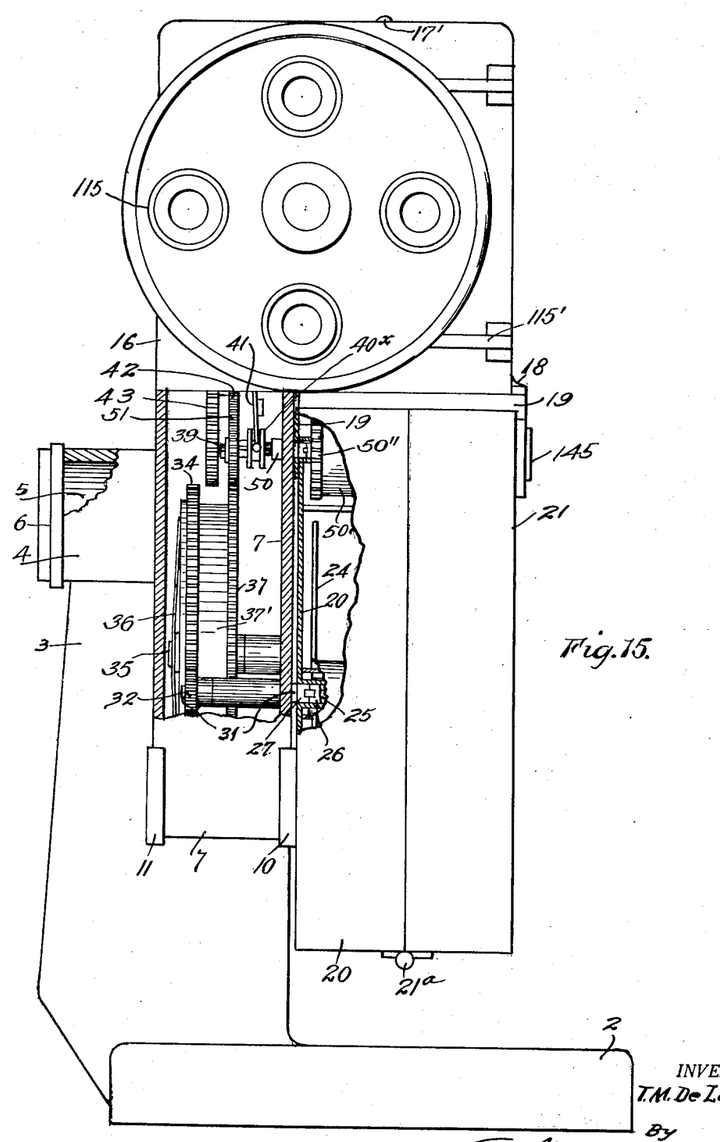
Figure 15 is a front view, partly in section on line 15—15, Fig. 1, of the camera assembly.

In Figs. 1 and 15 the magazine sections 20—21 are shown connected by a bottom hinge 21$^a$.

Figure 2:
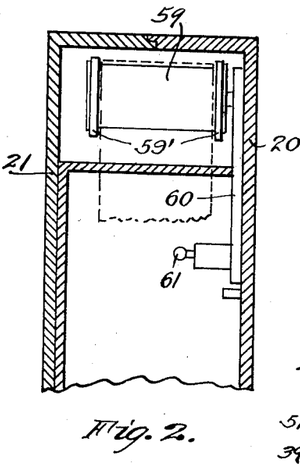
Figure 2 is a sectional view of the upper portion of the camera magazine showing a film guide roller.

Fig. 2 shows in detail a slide 60 carrying the roller 59 (flanged at 59') which is adjustable toward or from the sprockets 39'—50', Fig. 4. The slide has a simple latch 61 to secure it in adjusted position.

Figure 6:
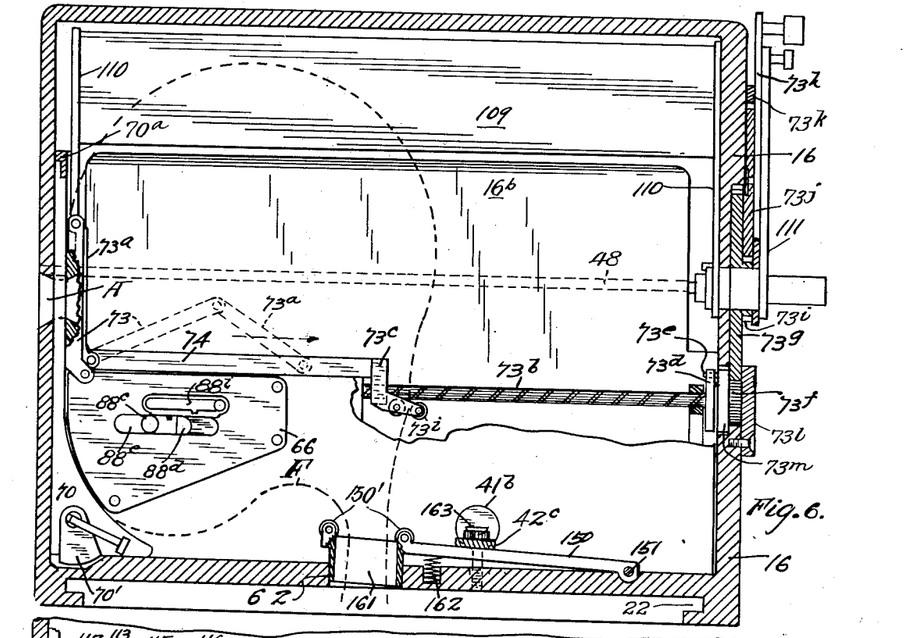
Figure 6 is a vertical, longitudinal section of the camera housing and shows the film movement shell disposed therein opposite to the camera aperture plate and illustrates the focusing device in raised, unobstructing position and illustrates a retractive pressure plate frame in effective position at the aperture plate and combined with means for retracting the plate to remove it from path of the focusing device and to deflect the film loop in the camera chamber clear of the focusing device; and also showing the magazine lock in releasing position.

Preferably the member 150, Fig. 6, has film guiding rollers 150' at the sides of throat 161. The upper end of the race block 70 is supported in a top frame part 70$^a$, Fig. 6. For clarity the block bolt 70 is omitted from Fig. 7.

Figure 9:
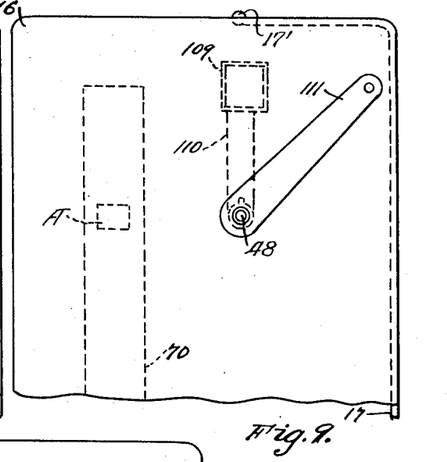
Figure 9 is a rear end view showing a crank for operating the focusing device.

Figs. 6 and 9 show a multiplying gear train 80 including gear 73$^g$ with a pinion 73$^i$ engaging gear 73$^j$ carried loose on lever 73$^h$ and engaging fixed quadrant-rack 73$^k$. The gear 73$^f$ is covered by a plate 73$^l$, on the box 16, Fig. 6, and is a part of disc 73$^m$ of pin 73$^e$.

Figure 7:
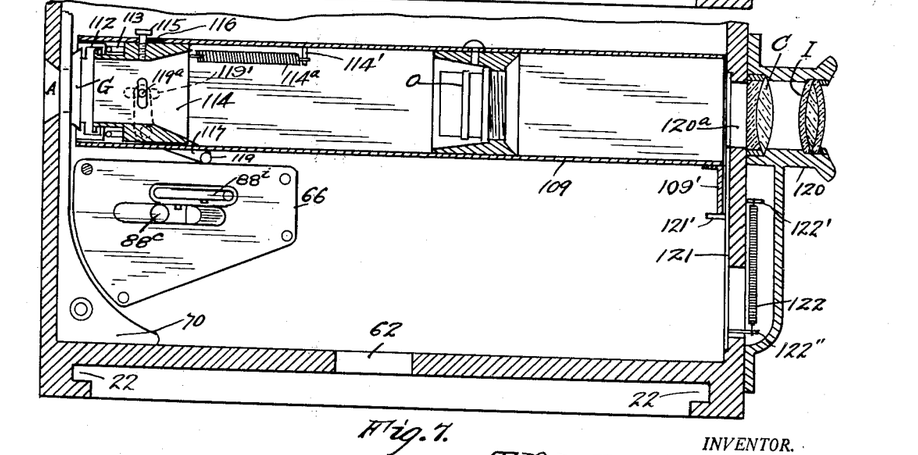
Figure 7 is a sectional view of the camera housing showing the focusing device as shifted into alignment with the focusing axis of the camera aperture.

In Fig. 7 the tube 109 is shown as having a lug 109' to engage a pin 121' fixed on the shutter 121, and to press the shutter to open position against closing action of spring 122, one end of which is attached to a fixed pin 122' and the other to a pin 122'' on the shutter. This figure also shows spring 114$^a$ as attached at one end to the carriage 114 and to a fixed pin 114'. The upright arm of lever 119 is shown in dotted lines and a longitudinal slot 119' is provided in the near wall of tube 109 for play of pin 119$^a$.

Figure 8:
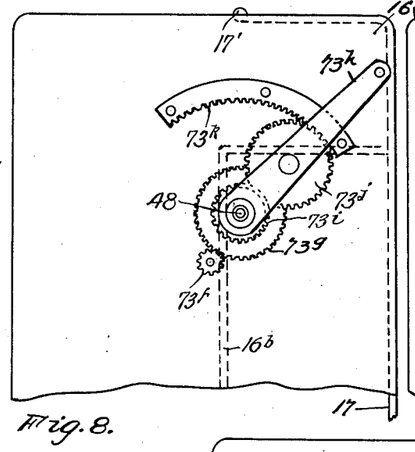
Figure 8 is a rear end elevation of a portion of the camera housing and illustrates a crank means for retracting the pressure plate.

Between the film chamber above the throat 161, Fig. 6, and the gear chamber in box 16 is a light stopping partition 16$^b$, Fig. 8.

Figure 10:
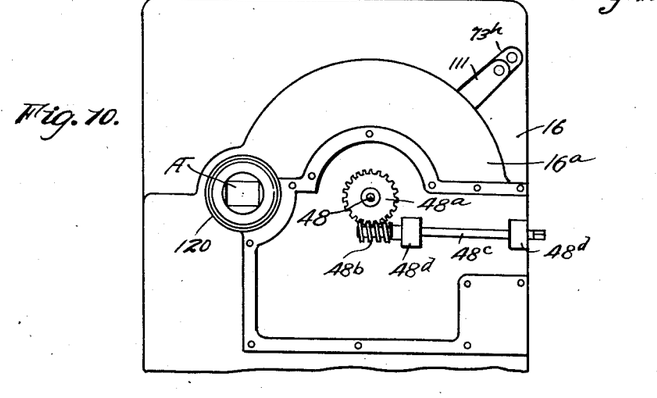
Figure 10 is a rear end view showing an applied cover plate with an eye piece for the view finder or focusing device and power transmitting mechanism for driving operative parts of the camera.

A hood plate of the hood 16$^a$, Fig. 10, is removed to disclose a gear 48$^a$, on shaft 48, engaging a worm 48$^b$ on drive shaft 48$^c$, which is supported in bearings 48$^d$ on a wall of box 16.

The sprockets 39'—50' have sets of sprocket teeth 39''—50'' respectively.

Figure 14:
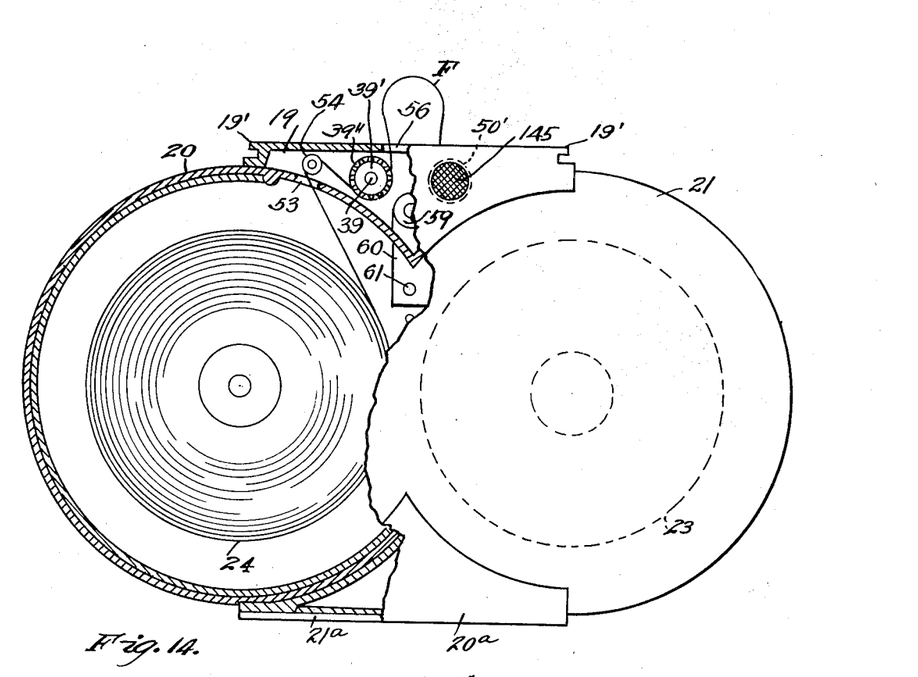
Fig. 14 is a sectional elevation of the detached magazine.

The magazine, Fig. 14, has top apertures of which one is shown at 53 and through which film passes to adjacent guide rollers, as 54, of which there is one beside each sprocket 39'—50'. From these sprockets a loop of film F passes through the dome opening 56 to the box 16. The hinge 21$^a$ is formed on a triangular bottom saddle 20$^a$ attached to the magazine sections 20—21.

The closed magazine 20—21 is attached to the box 16 by a dove-tail connection 19'—22 where the dome 19 sets against the bottom of the box 16.

A suitable clamping cap 6 secures the trunnion 5 in the journal 4, Fig. 15.

The friction connection between gear 37 and gear 34 includes a spring spider 36 acting against the gear 34; this pressing against the adjacent body 37' of gear 37.

The lower part of the casing 7 is held at desired adjustment between arcuate members 10—11, Fig. 15, shown in dotted lines in Fig. 1.

What is claimed is:

1. In a motion picture camera, a camera box having a focusing axis on an interior line directly from front to rear and provided with a film focusing plane on said line, a sealed exterior film transporting magazine, and mutual magazine and box connecting means for connecting the magazine top to the bottom of the box in a position wholly out of the focal axis line but on the vertical plane along said axis so that focus is made on said axis and vertical plane without interference by the magazine and means for pulling the film at the focal plane in a direction along and to an unobstructing position as to the focal axis and including a film engaging device adapted to draw the film below the focal axis without edgewise deflection of the film from the focal axis.

2. In a motion picture camera, a camera box having a focusing axis directly from front to rear and a focus plane for a film, and a magazine attached externally to the bottom of the box and in the vertical plane along said axis and wholly out of the axis line so that focus is made on the focus line while the magazine is in place and means operative in a direct line of path normal to the camera aperture to draw the film clear of the focal line and away from the said plane and including a device whereby the film is deflected from the focal axis.

3. In a motion picture camera, a camera box having a focusing axis directly from front to rear and a focus plane for a film, and a magazine attached externally to the bottom of the box and in the vertical plane along said axis and wholly out of the axis line so that focus is made on the focus line while the magazine is in place and means for feeding a bight of film from the magazine to the focal plane and bight elongating means operating in a path from said focal plane and along said vertical plane without lateral twist of the film and drawing the film away from the lens axis.

4. A motion picture camera having a focusing axis directly from front to rear and a film focusing plane, and exterior film magazine attached to the box and lying wholly clear of the line of the axis and on a plane passing along said axis and registering with the sides of the focusing plane so that film passing from the magazine to the film focusing plane travels without edgewise diversion and means mounted in the camera for movement toward or from the focal plane in a path in a plane which is normal thereto and including a bight elongating device to deform the bight in a direction unswerving from the vertical plane and remove the film from the lens axis.

5. A motion picture camera in which an external magazine is hung below the focal line and in which focus is made on a straight line through the camera from rear to front while the magazine is in place; the magazine being positioned to hold reels of film in the vertical plane along the focus axis a film register and feed movement at the focal aperture and wholly to one side of the said focal line, a movably mounted film guiding throat constituting a latch connecting the housing of the camera and the magazine and to which a part of a film bight runs from said movement, and means engaging the part of the bight running from the throat to the movement and operative in a path normal to the focal aperture to elongate the film to a position clear of and on the same side of the focal axis that the said movement is located and by which the film is removed from the focal axis.

6. A camera having a race block which is readily removable from the camera box, and means for fastening the applied block in position, said means including a device rotatively mounted in the block and having a blade part adapted to turn into locking engagement in a contiguous keeper part.

7. A camera including a film movement box and an exterior, separate, film protecting magazine externally attachable to the box, and a locking means securing the magazine to the box in its exterior position; the magazine having a bight opening and said box having an opening registering therewith and said means including a bight collar latching in said openings and a device for holding the collar in latching position.

8. A camera including a film movement box having a movable cover, an exterior magazine attachable to the box, and a locking means securing the magazine to the box; said cover automatically actuating said means as the cover is closed on the box, and said means including a plunger operatively mounted in the box and a latching element operative thereby to interlock in the attached magazine and secure it in place.

9. A camera including a film movement box and an exterior magazine externally attachable to the box said parts provided with registered film passageways and having a movable light trap at the line of junction between the box and the magazine where the film passes to the box from the magazine and vice versa; said light trap including a film guide collar entering said passageways and interlockable in the attached magazine to hold it.

10. A camera including a film movement box and a separate transparting magazine attachable to the box and from which film is threadable to the focal plane of the camera and means securing the magazine in attached position to the box, said box including driving clutches and the magazine having film moving sprockets adapted to be coupled to the clutches for motivation and the box having a cover and means actuated thereby for throwing the clutches into sprocket mesh when the magazine is in place, said magazine and the box having means for mounting the magazine in external position with the film feeding clutches in cooperative relation.

11. A camera including a film movement box and a separate external reel magazine having exterior mount means by which it is attachable to the box, and a locking means securing the applied magazine to the box; said box including exposed driving clutches and the magazine having exposed clutch parts, for film moving sprockets, adapted to be coupled to the clutches for motivation when the magazine is in applied relation; the box having a cover and means actuated thereby for throwing the clutches into sprocket mesh when the magazine is in place and said means adapted for independent manual action while the cover is open.

12. A motion picture camera having a camera box, a gear casing extending below the box and to one side of the focal plane of the camera and having film-drive coupling means presented to the focal side and said box overhanging said side and having on its bottom an exterior, magazine mount, and a magazine having film reel drive means engageable with said coupling means when the magazine is applied to said mount.

13. A motion picture camera including a camera section, and a film magazine removably attached to the section and disposed in the plane, on the focal axis, which extends from top to bottom of the camera section and arranged wholly clear of the line of said axis so as to permit unobstructed focus, and film motivating means comprising cooperative mechanisms in said housing and in said magazine and including mutual coupling parts exposed in side walls of the camera and of the magazine which are opposed and contiguous when the magazine is attached to the camera.

14. A motion picture camera including a camera housing having external mount means at its lower part and a pendant gear box portion offset as to the housing and presenting a side wall offset from and parallel to the vertical plane along the focal axis of the camera, a magazine hung on said mount means and having winding reels disposed on the said vertical plane for run of film to and from the camera without shift from said plane, the magazine having a side wall opposed and contiguous to the said box side wall, and mechanisms in said box and in said magazine including mutual clutch devices presented in the opposed side walls to effect operative combination of said mechanisms.

15. A camera film magazine having means for exterior attachment to a camera and comprising a main reel or body section on which is mounted a reel spindle and winding and feeding sprocket mechanism, and a cover section hinged at its bottom to the main section on a plane parallel to the plane of the main section and adapted to be opened laterally to facilitate access into the main section.

16. A camera, exterior film magazine having a system of film reeling sprockets, and a set of exteriorly exposed yieldably mounted push buttons having inner members adapted to engage with and turn relative sprockets by manual effort on said buttons.

THEODOR M. DE LA GARDE.